Sept. 8, 1931. A. M. SCHICK 1,822,671
AIR AGITATOR
Filed Feb. 13, 1930
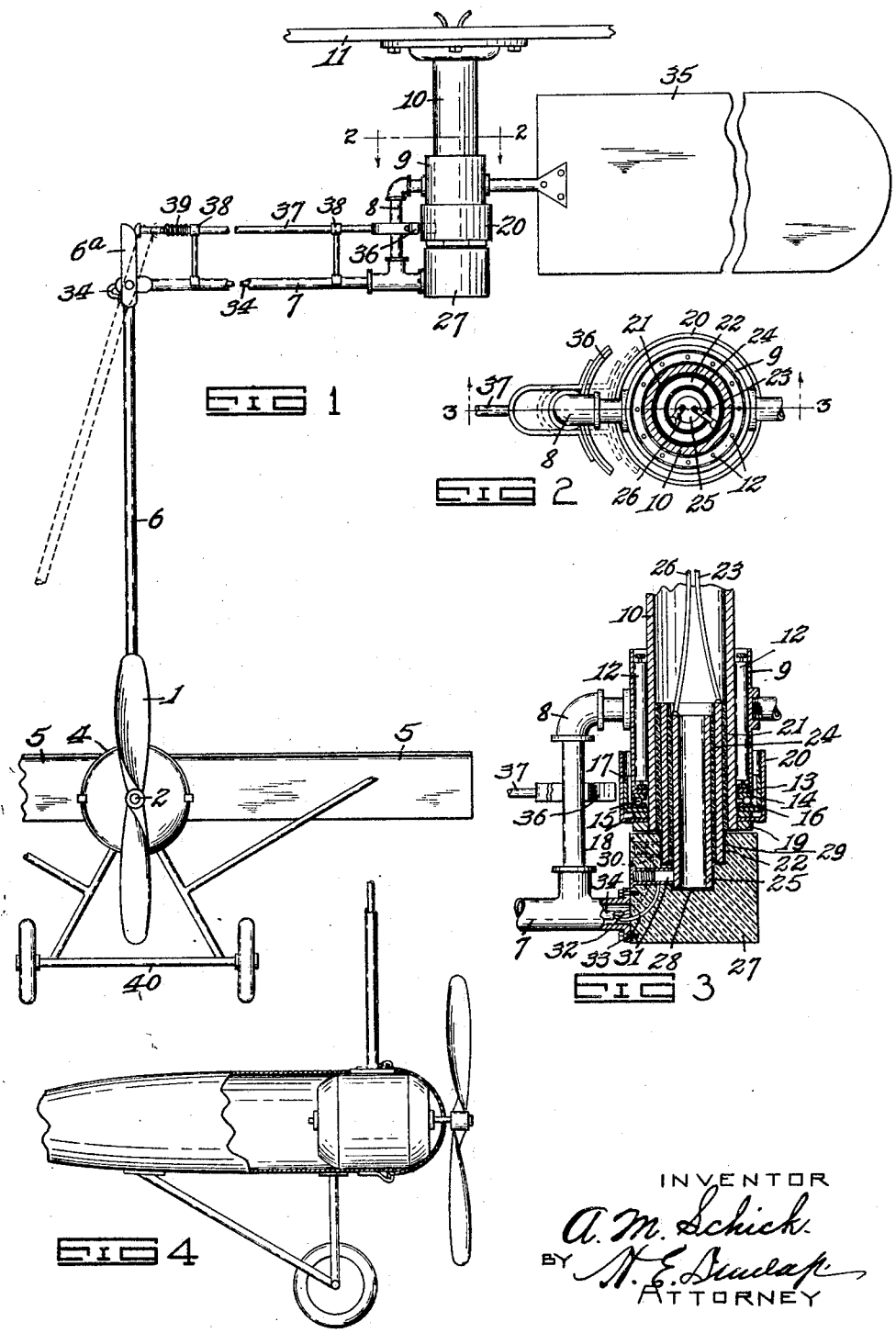

Patented Sept. 8, 1931

1,822,671

UNITED STATES PATENT OFFICE

ADOLPH M. SCHICK, OF WHEELING, WEST VIRGINIA, ASSIGNOR OF ONE-FOURTH TO E. G. VOLTZ, OF WHEELING, WEST VIRGINIA

AIR AGITATOR

Application filed February 13, 1930. Serial No. 428,073.

This invention relates broadly to ventilating apparatus, and more specifically to mechanism of the general type of an electric fan whereby the air of a room may be caused to circulate.

The primary object of the invention is to provide a room-air circulating apparatus embodying an electrically driven fan-like element, as a blade or propeller, adapted to travel in a substantially fixed circular path and whereby the air of the room is continuously agitated.

A further object of the invention is to provide a novel device of the character mentioned wherein the air-agitating element may be provided in the form of a propeller of the type employed in airplanes, and may have associated therewith a miniature airplane fuselage designed as a housing for the driving motor.

In describing the invention in detail, reference is herein had to the accompanying drawings, in which—

Figure 1 is a side elevation of the invention;

Figure 2 is an enlarged cross section on line 2—2, Fig. 1;

Figure 3 is a longitudinal section on line 3—3, Fig. 2; and—

Figure 4 is a side elevation of the air-agitating element and its driving motor, said element being shown in the form of the propeller for a miniature airplane and the fuselage of the latter being shown in section.

Referring to said drawings, 1 designates a propeller, herein shown as having the conventional form of an airplane propeller, the same being mounted upon a shaft 2 driven by an electric motor 3. As herein shown for illustrative purposes, said propeller 1 and said motor 3 constitute parts of a miniature airplane, the motor being housed within the nose portion of an airplane body or fuselage 4 to which are suitably attached wings 5 and an undercarriage 40. As shown, said fuselage is carried by said motor, having its substantially cylindrical forward end portion disposed in closely embracing rigid relation to said motor. The motor is rigidly carried upon the lower end of a tubular suspension rod 6 which is pivotally mounted at or adjacent to its upper end upon the outer end of a horizontal arm 7. The opposite end of said arm is rigidly carried on the lower end of a bracket arm 8 which, in turn, is rigidly mounted on a vertically disposed shell or hub 9 which is rotatable with respect to a tubular suspension rod or support 10 which depends from an overhead support, as a joist or other fixed ceiling member 11. Roller bearings 12 interposed between said hub 9 and said suspension rod or tube 10 are designed to facilitate rotary movement of the former on the latter, said bearings being supported at their lower ends by an inwardly directed end flange 13 formed on the lower end of said hub. Additionally, said flange 13 rests upon the upper ring 14 of a ball-thrust bearing which encircles said suspension rod 10, as shown, said ring 14 being mounted upon ball bearings 15 which, in turn, travel in a race provided therefor in the lower ring 16 of said ball-thrust bearing.

The thrust bearing described has its said lower ring 16 seated upon an inwardly directed flange formed on the lower end of a cup 17 which constitutes a support or casing for said bearing, said flange being, in turn, seated stationarily upon an upper jam nut 18 which is threaded upon the suspension tube 10 adjacent to the lower end of the latter. Interposed between said nut 18 and an underlying, or lower, jam nut 19 threaded upon said end of the suspension tube is an internal annular flange formed upon a cylindrical brake drum 20 which will hereinafter be referred to.

Carried within and in fixed relation to the lower end of the suspension tube 10 and insulated from the latter by a sleeve 21 of fiber or other appropriate material is a tubular metallic sleeve 22 which constitutes a conductor for electric current, having suitably connected to its upper end a current conducting wire 23 which preferably leads thereto from a source of electrical energy (not shown) through the interior of the suspension tube. The lower end of said sleeve protrudes a distance from the corresponding end of the suspension tube 10, as shown. Also disposed interiorly of and in fixed relation to said sleeve 22 and insulated from the latter, as by a fiber sleeve 24, is a cylindrical member 25 which has its lower end protruding from the corresponding end of said sleeve 22, as shown. Said member 25 constitutes a current conductor, having attached to its upper end a current conducting wire 26 in the opposite side of the electrical circuit which includes the wire 23.

Carried in fixed relation to the horizontal arm 7 in order that it may have rotary movement with said arm is a brush carrier 27 formed of a suitable insulating material, as fiber, and which is provided with concentric sockets 28 and 29 within which are received the protruding lower ends of the current conducting member 25 and current conducting sleeve 22, respectively. Brushes 30 and 31, from which lead current conducting wires 32 and 33, are disposed in horizontal guideways provided therefor in said brush carrier 27. The outer ends of said brushes are abutted by adjusting screws whereby they may be advanced into direct contact with the members 22 and 25, respectively. The wires 32 and 33 enclosed by a cable 34 lead outward through the interior of the arm 7 and thence downward to the motor 3 through the suspension rod 6.

A fan-like arm 35 of any appropriate form and size may be carried by the hub 9, as shown in Fig. 1, the same being designed as an additional means for producing agitation of the air of the room.

In practice, when the electric circuit to the motor 3 is closed, the motor functions to rapidly rotate the propeller 1 which acts upon the air, not only to produce rapid circulation of the air, but also to propel itself and its motor, together with its suspension rod 6 and the supporting arm 7 in a forward direction wherein a circular path is traversed, the supporting hub 9 rotating upon its bearings 12. Since the brush carrier 27 is rotated with the arm 7, current is continuously supplied to the motor through the current-conducting members 22 and 25 and the brushes 30 and 31 which are continuously maintained in electrical contact with said members.

As the speed of travel of the propeller and its motor increases, the centrifugal force obviously will tend to cause the suspension rod 6 to swing outward on its pivot. To limit the speed of such travel, a movement retarding brake is provided, the same comprising a brake-shoe 36 designed to be moved into frictional engagement with the stationary brake drum 20 hereinbefore referred to. Said shoe 36 is carried upon an end of a horizontal rod 37 which is mounted for longitudinal movement in suitable guide members 38 borne by the arm 7. The opposite end of said rod 37 is disposed in a position wherein it will be forcibly engaged by an upward extension 6ª of said suspension arm 6 when the latter swings outward toward the dotted line position shown in Fig. 1. So engaged, said rod 37 is thrust longitudinally to a position wherein said brake-shoe frictionally engages the drum 20. A compression spring 39 carried by the rod 37 is designed normally to maintain the latter in its outwardly thrust position wherein the brake shoe is withdrawn from engagement with said drum.

What is claimed is—

1. Air-agitating apparatus of the character described, comprising a vertical supporting member, a hub mounted for rotation on said member, a laterally directed arm carried in fixed relation to said hub, a suspension rod depending from said arm, an electric motor supported by said rod, a propeller associated with and driven by said motor, said motor and said hub-supported elements being adapted, actuated by said propeller, to travel in a substantially circular path with said hub rotating on said supporting member, and means for limiting the speed of such travel, said means being arranged for actuation by centrifugal force which functions through the medium of said suspension rod.

2. Air-agitating apparatus of the character described, comprising a vertical supporting member, a hub mounted for rotation on said member, a laterally directed arm carried in fixed relation to said hub, a suspension rod depending from said arm, an electric motor supported by said rod, a propeller associated with and driven by said motor, said motor and said hub-supported elements being adapted, actuated by said propeller, to travel in a substantially circular path with said hub rotating on said supporting member, and an automatic brake for limiting the rate of travel, said brake including a brake drum carried in fixed relation to said supporting member, a shiftable spring-pressed rod, and a brake shoe carried by said rod, said rod being adapted to be actuated to braking position by outward swinging movement of the suspension rod.

3. Air agitating apparatus of the character described, comprising a stationary vertically disposed support, a hub mounted for rotation on said support, a laterally directed arm carried by and rotatable with said hub, a suspension member having pivotal connection with said arm, an electric motor supported by said member, a propeller supported and adapted to be driven by said motor, said propeller being adapted to actuate travel of said motor and its carrying elements with said hub rotating on said stationary support, said suspension member being adapted for actuation under the centrifugal force of rotation to swing outward on its said pivotal connection, and brake mechanism for limiting the speed of rotation of said hub and the thereby carried elements, said mechanism being adapted to be actuated to operate by the outward swinging movement of said suspension member.

In testimony whereof, I affix my signature.

ADOLPH M. SCHICK.